July 19, 1955  J. M. COYNER  2,713,322
LIVESTOCK CAR FEEDING, COOLING, AND WATERING EQUIPMENT
Filed Aug. 9, 1951  3 Sheets-Sheet 3
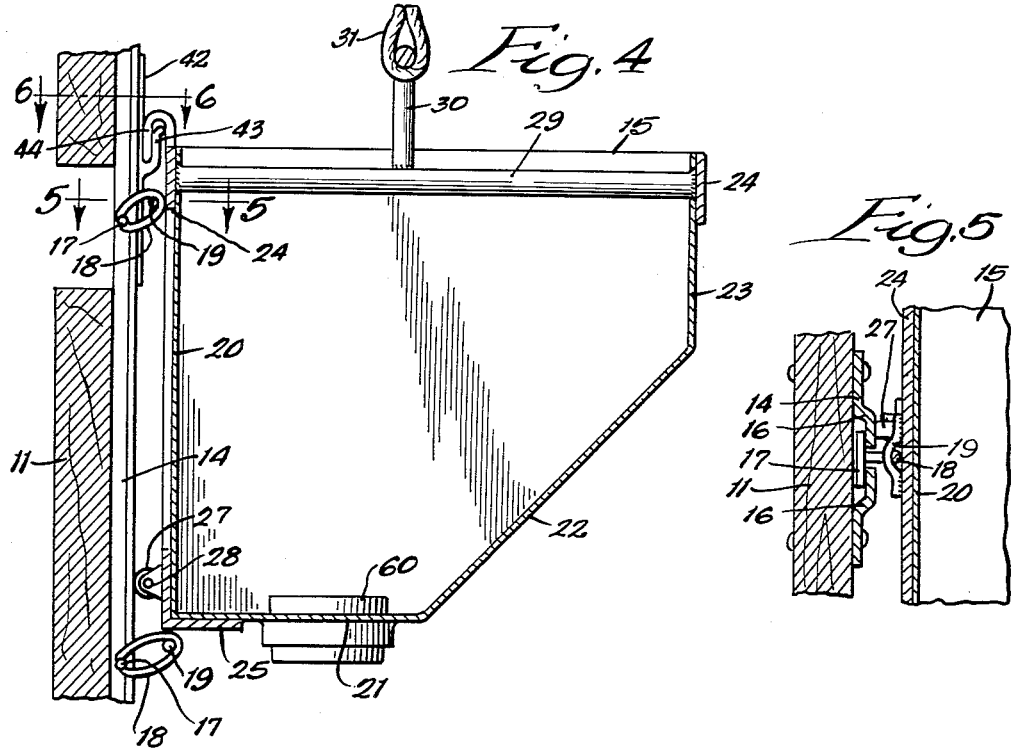
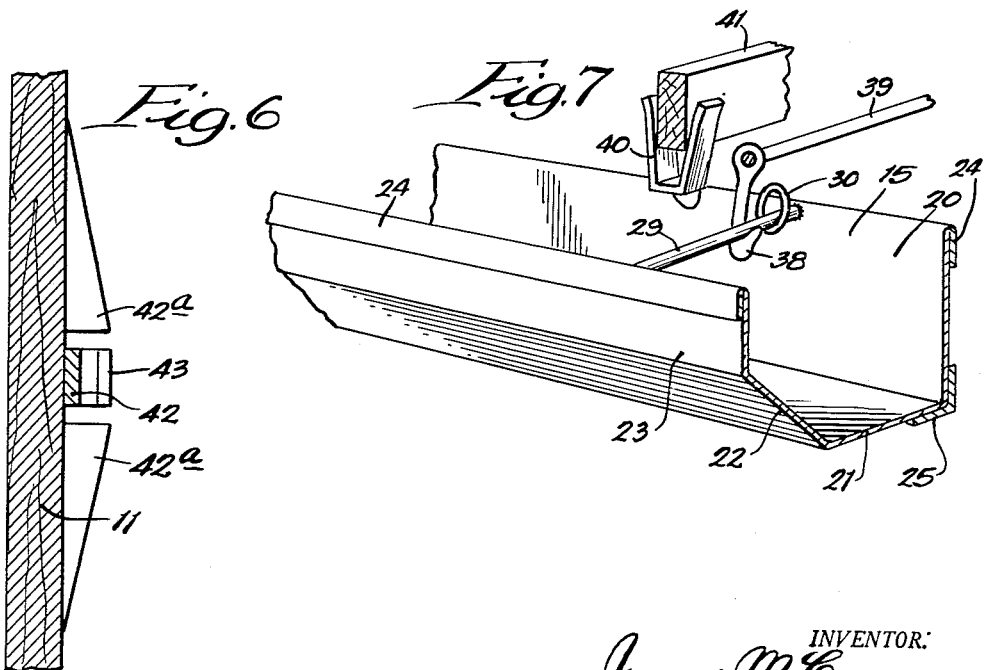
INVENTOR:
James M. Coyner,
BY
Dawson & Ooms,
ATTORNEYS.

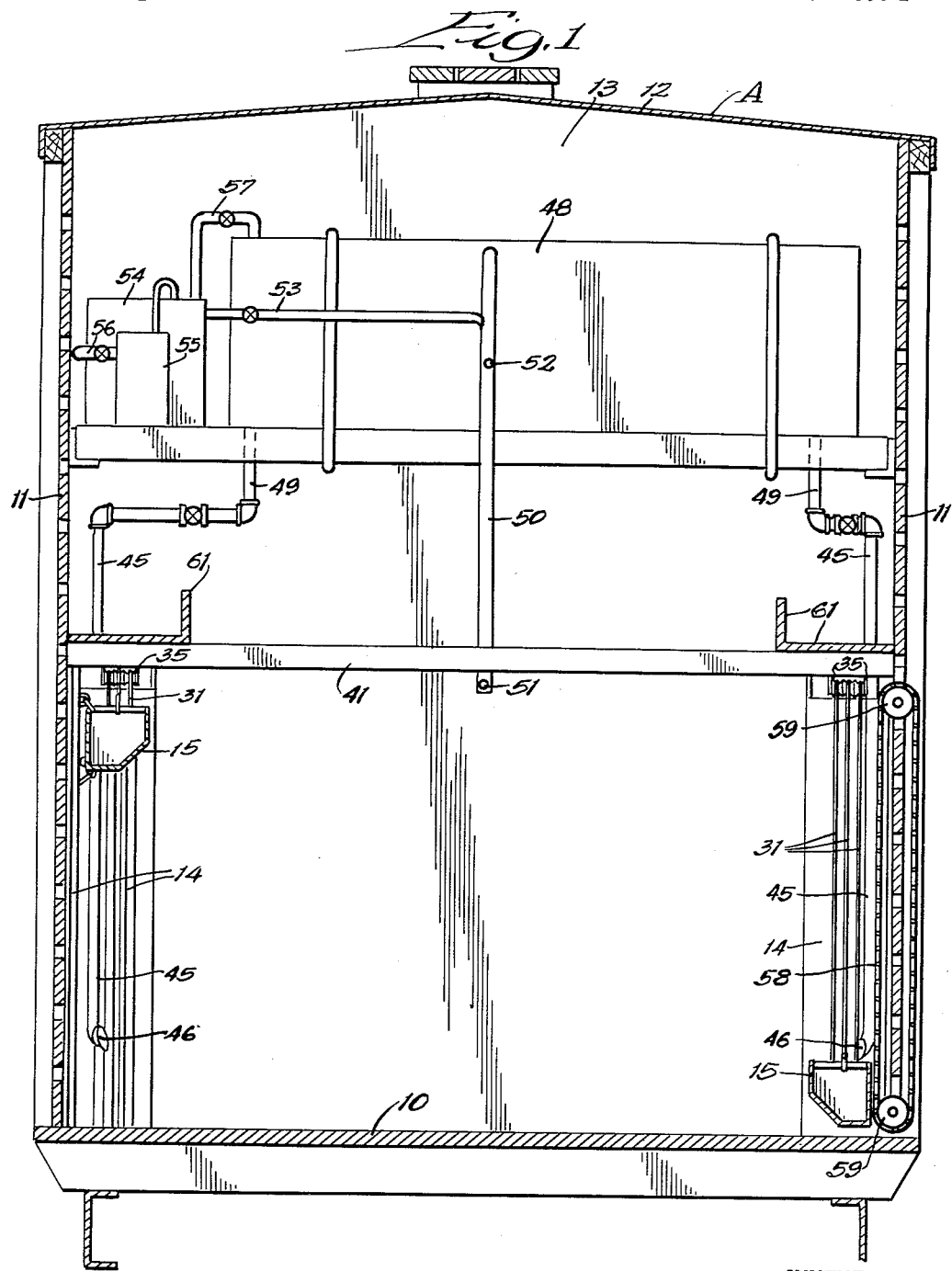

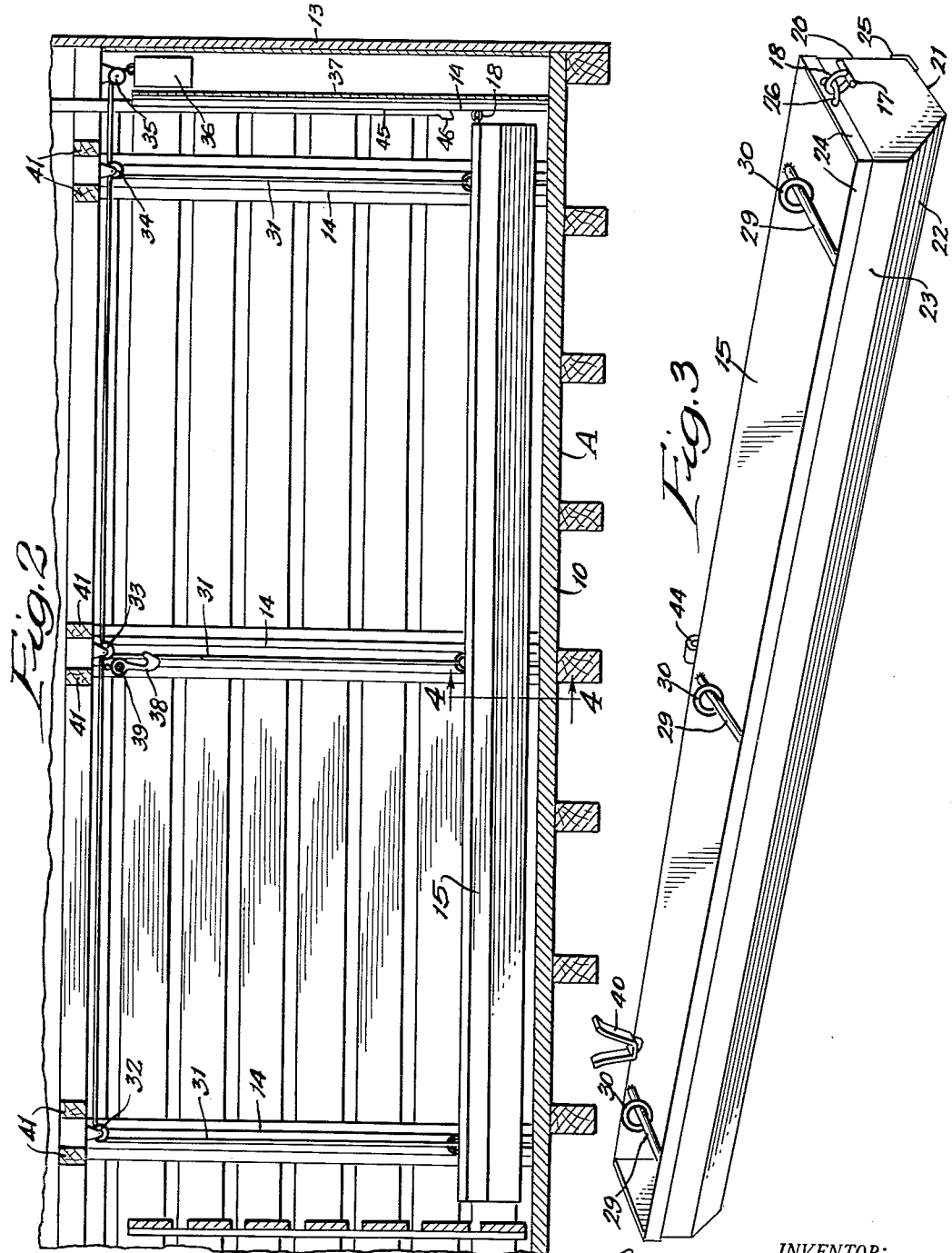

United States Patent Office 2,713,322
Patented July 19, 1955

2,713,322

LIVESTOCK CAR FEEDING, COOLING, AND WATERING EQUIPMENT

James M. Coyner, Madison, Wis.

Application August 9, 1951, Serial No. 241,011

6 Claims. (Cl. 119—10)

This invention relates to livestock car feeding, cooling and watering equipment. The equipment of a livestock car with efficient watering, feeding, etc. equipment has long presented a serious problem. Suggestions have been made for raising troughs above the floor, introducing water into troughs, and for spraying water on to hard floors, but the equipment has not been able to withstand the severe jolting and hammering effect of railway travel. When a stock train or freight train stops and starts, there is a severe jerking and jolting of the cars, and any equipment within the cars is subjected to heavy blows which tend to destroy the equipment or to batter the car walls. While the suggestions have been made, no one has heretofore produced a livestock car equipped with such feeding and watering devices which could be successfully employed, and up to the present time it has remained the practice to stop the cars periodically in transit, carry troughs into the cars, and after feeding the stock to remove the troughs, or, alternatively, to drive the stock from the cars and into feeding lots. The foregoing results in long delays, requires considerable labor, and has long been unsatisfactory.

The wetting of stock by sprays has been found unsatisfactory and an unhealthful procedure. An atomized spray or mist-like application of water is not injurious, but is desirable. However, up to the present time no means has been provided for the application of moisture in this manner.

An object of the present invention is to provide a livestock car equipped with feeding and watering means and with means for applying an atomized spray of water to the stock, while at the same time providing means which stabilize and protect the troughs in their lowered and elevated positions and while also facilitating the raising and lowering of the troughs from inside and outside the car.

A still further object is to provide means for effectively supplying water to the troughs while effectively supporting the troughs in aligned position while also providing means for preventing binding or jamming of troughs during the process of raising or lowering them and while also reducing the friction involved in the vertical movement of the troughs. A still further object is to provide means preventing upsetting of the troughs while controlling the end-thrust thereof and preventing the falling or drifting down of the troughs after the same have been raised. A still further object is to provide an extremely sturdy and reinforced trough having a slope on the forward bottom side thereof to prevent hogs from climbing into the trough while also providing overhead shelves for carrying grain, feed, etc.

Yet another object is to provide in a livestock car structure means for counterbalancing the weight of a trough by a plurality of cables engaging a single weight and which maintain the trough constantly level. Yet another object is to equip at least one end of a car with water supply means whereby water can be introduced into a trough while the end of the trough is held at a constant spaced relation to the end wall while further utilizing the compressed air supply of the car for atomizing water at the end of the car for applying a mist of spray to the stock. Other specific objects and advantages will appear as the specification proceeds.

The invention is shown, in an illustrative embodiment, by the accompanying drawings, in which—

Figure 1 is a vertical sectional view of a stock car equipped in accordance with my invention; Fig. 2, a broken longitudinal sectional view; Fig. 3, a perspective view of one of the troughs employed; Fig. 4, a broken enlarged sectional view, the section being taken as indicated at line 4—4 of Fig. 2; Fig. 5, a sectional detail view, the section being taken as indicated at line 5—5 of Fig. 4; Fig. 6, a broken sectional detail view, the section being taken as indicated at line 6—6 of Fig. 4; and Fig. 7, a broken perspective view showing a portion of the trough and supporting and bracing means therefor.

In the illustration given, A designates a livestock car provided with a floor 10, side walls 11, a roof or top wall 12, and an end wall 13. It will be understood that any type of stock car may be employed. In the illustration given, the side walls 11 are formed by slats, conforming to the usual practice in the fabrication of stock cars. Further, in the illustration given, the car is provided with a single floor 10. It will be understood that for the transportation of hogs and sheep, etc., the stock car may be provided with two floors (not shown) and the equipment varied for the provision of watering, feeding and cooling means for each of the compartments thus formed. For the purpose of illustration herein, a single floor will suffice.

The side and end walls of the car are provided with guide channels 14 adapted to receive elements fixed to the trough 15 for guiding the trough in its vertical travel. The channels 14 may be of any suitable structure or type. In the illustration given, in Fig. 5, the channels are provided by two spaced offset or Z-bars 16 which are riveted to the car frame and provide channels adapted to receive a pin 17 secured to a link 18. The link 18 engages a loop member 19 secured to trough 15.

The trough 15 may be of any suitable construction. In the illustration given, I provide a trough having a straight rear wall 20, a bottom wall 21, and an angularly-extending front wall portion 22 surmounted by a straight front wall portion 23. The wall portion 22 is pitched at substantially 45° and is effective in preventing hogs from placing their feet within the trough. A metal strap 24 extends about the periphery of the trough and the trough is further protected by an angle iron brace 25 which extends along the lower outer edge of the trough for its entire length. The loop 19 is welded to the metal strap 24 and the end loop 26 is also preferably welded to the metal strap 24, as indicated in Figs. 2 and 3.

The trough 15 slides with a minimum of friction upon the outer surfaces of the offset or Z-bars 16, and to prevent tipping of the trough, I prefer to employ two link connections on the outer side of the trough, one link connection being at the top of the trough and the other being at the bottom, as shown more clearly in Fig. 4. The loop strap 19 for the lower link is secured to the angle iron brace 25. As additional means for reducing friction between the trough and the channel members 14, a roller 27 may be supported upon brackets 28 mounted upon the angle iron member 25, as shown more clearly in Fig. 4.

In order to suspend the trough 15 evenly throughout its length, I provide the trough with crossbars 29, each equipped with a ring 30. To each of the rings is attached a cable 31, and the cables extend through overhead pulleys 32, 33 and 34 and thence over a multiple pulley 35 at one corner of the car, the cables then being connected to a counterbalance weight 36 guided for movement within a hollow vertical post 37.

To support the trough in elevated position and to prevent it from falling or drifting downwardly, I provide a pivoted hook 38 mounted upon a rockshaft 39 accessible from inside and outside of the car. When the trough is raised, one of the rods 29 or a similar rod will cam the hook laterally until it passes the hook and then the hook, by its own weight, will swing under the rod to support the trough automatically in raised position. For releasing the trough, the rockshaft 39 may be rotated to allow the hook to clear the rod 29 and thus free the trough for lowering.

The linkage at the end of the trough takes care of endthrust to a considerable degree, but I prefer to further buttress the trough against endthrust by equipping the trough with a V-shaped member 40, which engages a cross-beam 41 at the upper limit of its movement and thus further holds the trough against endwise movement.

For stabilizing the trough in its lowermost position, I secure to the side wall 11 a hook support member 42 equipped with a hook 43. The hooks may be held in interlocking relation by spaced abutments 42a, as shown more clearly in Fig. 6. The metal strap 24 is provided with a cooperating hook member 44, which wedges into tight engagement with hook 43 when the trough is in its lowermost position.

Because of the hollow post 37 occupying a corner of the car, the linkage 18 is secured preferably onto channel members 14 at the inner end of the post 37, and I provide a downwardly-extending water pipe 45 just above the end linkage 18 and providing an inwardly-turned spout 46 aligned longitudinally with the trough 15. Thus the end of the car with its counterbalance post 37 provides a support for the trough in maintaining it adjacent the car end wall and in alignment with the pipe spout 46 so that the trough may be effectively filled with water when in lowered position. At the same time, the pipe 45 does not interfere with the free vertical movement of the trough.

While, in the foregoing description, I have described equipment for a single trough by way of illustration, it will be understood that there are four or more troughs, two on opposite sides of the car, and on opposite sides of the car door. I supply water to the troughs, preferably by providing at one or both ends of the car a water tank 48 equipped with valve pipes 49 leading therefrom and connecting with the pipes 45. I prefer to equip the end of the car adjacent the tank 49 also with a vertical atomizer pipe 50 having atomizer nozzles 51 and 52. Compressed air and water are supplied to the pipe 50 through the valve-controlled line 53 leading from a pressure chamber 54. A compressed air reservoir 55 communicates through valve-controlled line 56 with the compressed air reservoir (not shown) of the car. Communication between the water tank and the chamber 54 is provided through valve-controlled pipe 57.

I prefer to provide means for raising the trough not only from within the car, but from outside of the car. In the specific illustration given, in Fig. 1, there is shown an endless chain 58 mounted upon sprockets 59, one portion of the chain being exposed to the exterior of the car. The trough may be provided at one end with an opening which is closed by a plug 60. The chain is welded at one end to the inside of the trough and by pulling the protruding portion of the chain from outside of the car, and trough may be raised or lowered.

Above the trough-raising mechanism may be mounted storage shelves 61 for receiving grain or other feed.

Operation

In the operation of the structure, the troughs 15 may be raised to the position shown at the left of Fig. 1 and grain or other feed deposited within the troughs. In the raised position, the troughs are automatically held against downward movement by the hooks 38. By rotating the shaft 39, the troughs may be freed and lowered to a position upon the floor. In the latter position, the hooks 43 will be engaged by the trough hooks 44 to anchor the troughs firmly in position. By controlling the valves in pipes 49 and 45, water may be introduced into the troughs while they are held in lowermost position adjacent the end of the car. When the troughs are lifted to elevated position and engaged by hooks 38, the V-shaped members 40 engage the crossbeams 41 and the troughs are thus anchored against endwise thrust by such members and the end links.

When it is desired to apply a mist-like or atomized spray to the stock, compressed air may be admitted through the line 56 to tanks 55 and 54 and compressed air and water discharged through the atomizer nozzles 51 and 52 in pipe 50. By thus storing the water tank in one end of the car, water is supplied for the troughs and for the atomizing sprays from the single source and with a minimum of conduits.

The troughs are kept from bending or twisting, even though in contact with heavy hogs or other animals, by the reinforced structure, and the troughs are kept constantly level by the flexible cables attached to the counter-weight. At the same time, binding or jamming of the troughs is prevented by the side and end linkage to the ends of the car. Friction is minimized by the Z-bar surfaces and also by the roller at the bottom of each trough. Further, the troughs are attached to the supporting cables at the center of the shaft, which further reduces friction during the vertical movement of the troughs.

Upsetting of the troughs is prevented effectively by the side linkage at the top and bottom of the trough, thus connecting the top and bottom portions of the trough to the sides of the car, and the roller further is effective against such upsetting.

While the spray nozzles have been shown at one end of the car, it will be understood that such nozzles may be placed at spaced intervals along the sides of the car. Further, if desired, the hooks 43 and 44 which are employed to stabilize the trough in its lower position may be utilized, in reversed relation, at the top limit of the movement of the trough for stabilizing the trough similarly in its upper position. While the hook 38 swings normally to one side as it is engaged by the cross-rod 29, it will be understood that a spring may be employed for urging the hook toward the engaging position shown in Fig. 7 and the rod 39 may be equipped with a handle extending outside of the car for rotating the rod to free the hook 38 from engagement with the cross-rod 29.

End thrust is controlled by the linkage at the end of the trough at right angles to the side linkage and by the snubber members 40 and 41 connecting the trough to a cross-tie when the trough is in the upper position. The trough can be raised or lowered from either inside or outside of the car by the structure described.

While, in the foregoing specification, I have set forth a specific structure in considerable detail for the purpose of illustrating embodiments of the invention, it will be understood that such details of structure may be varied widely by those skilled in the art without departing from the spirit of my invention.

I claim:

1. In a livestock car having side walls and end walls and equipped with an elevated cross-beam, a trough, means slidably connecting the trough to the side wall of the car, and a V-shaped member secured to said trough and adapted to engage said cross-beam only when the trough is raised to its uppermost position for rigidifying the trough relative to said car.

2. In a stock car having side walls and end walls, a trough, means for raising and lowering a trough along a side wall of the car, said trough being equipped with a downwardly-extending hook, a hook member secured to the side wall of the car and having an upwardly-extending hook, said hooks being engageable for anchoring the trough to the side wall of the car only when the trough is lowered to its lowermost position for rigidifying the trough relative to said car.

3. In a stock car having side and end walls, a trough mounted along one side wall of the car, means for raising and lowering the trough along said side wall, said trough being provided with a transverse strap, a rockshaft mounted transversely of the car, and a hook mounted upon said rockshaft and engageable with said cross strap of the trough to maintain said trough in raised position until said rockshaft is turned to free said hook from said strap, said rock shaft extending through a wall of said car and being manipulatable from the outside thereof.

4. In a livestock car having a side and end wall and equipped with a trough, a plurality of channel-forming members vertically secured to the side wall of the car, pin-equipped links providing a rigid structure and engaging said channel members, loops secured to the top and bottom portions of the trough and engaging said links, a counterbalance member mounted in a hollow post at one end of the car, cables secured to the trough at spaced points and supported upon pulleys, said cables having their end portions secured to said counterbalance member, a guide channel secured to said hollow post, a guide pin within said channel, a link rigidly secured to said pin, and a loop member engaging said link and secured to the end of said trough.

5. In a livestock car having side walls and an end wall, a trough along one side of the car and having its end adjacent the end of the car, a plurality of channel-forming members along the side walls and the end wall of the car, members secured to the top of the trough and to the bottom of the trough and having members extending into and engaging said channel for confining said trough slidably to the side wall of the car, and a guide member pivotally secured to the end of the trough and having a retaining member engaging the channel of the end wall of the car.

6. In a livestock car having side walls and end walls, a trough along one side and near one end of the car, vertical members secured to the side of the car and to the end of the car providing channels, guide means engaging said channels and secured to said troughs, counterbalance means secured to said trough at spaced points thereon and facilitating the raising and lowering of the trough, and interlocking means upon said car frame and said trough for anchoring said trough rigidly in its extreme raised and lowered positions.

References Cited in the file of this patent

UNITED STATES PATENTS

| | | |
|---|---|---|
| 232,732 | Leber | Sept. 28, 1880 |
| 239,527 | McPherson | Mar. 29, 1881 |
| 244,076 | Rex | July 12, 1881 |
| 250,862 | Williams | Dec. 13, 1881 |
| 254,442 | Pentz | Feb. 28, 1882 |
| 276,595 | Joiner | May 1, 1883 |
| 303,418 | Christopher et al. | Aug. 12, 1884 |
| 310,463 | Perkins et al. | Jan. 6, 1885 |
| 321,860 | Sell | July 7, 1885 |
| 401,091 | Wilson | Apr. 9, 1889 |
| 415,404 | Avery | Nov. 19, 1889 |
| 432,506 | Brownell | July 22, 1890 |
| 1,239,558 | Betts | Sept. 11, 1917 |
| 1,592,787 | Stipp | July 13, 1926 |
| 2,407,216 | Ball | Sept. 10, 1946 |
| 2,498,647 | Burnam | Feb. 28, 1950 |
| 2,502,720 | Haley | Apr. 4, 1950 |
| 2,538,879 | Newcomb et al. | Jan. 23, 1951 |
| 2,547,927 | Daugherty | Apr. 10, 1951 |
| 2,595,337 | Coyner | May 6, 1952 |
| 2,652,024 | Coyner | Sept. 15, 1953 |
| 2,685,272 | Coyner | Aug. 3, 1954 |